United States Patent

[11] 3,593,265

| [72] | Inventors | Donald W. Howard;<br>Keith H. Fulmer; Harold B. Schultz, all of<br>South Bend, Ind. |
|---|---|---|
| [21] | Appl. No. | 784,775 |
| [22] | Filed | Dec. 18, 1968 |
| [45] | Patented | July 13, 1971 |
| [73] | Assignee | The Bendix Corporation |

[54] PRESSURE INDICATING SYSTEM
19 Claims, 5 Drawing Figs.

[52] U.S. Cl. .................................................. 340/52 C,
200/82
[51] Int. Cl. ................................................. B60q 1/00
[50] Field of Search .......................................... 340/52 C,
52 F, 52, 63, 213, 213 Q, 240, 331; 200/82.3, 82

[56] References Cited
UNITED STATES PATENTS
1,408,221  2/1922  Pendergast................  200/82

| 3,034,017 | 5/1962 | Larson et al. | 340/331 X |
| 3,188,623 | 6/1965 | Culbertson | 340/331 |
| 3,196,389 | 7/1965 | Heidner | 340/52 (F) X |
| 3,421,322 | 1/1969 | Reznicek | 340/52 (C) (UX) |
| 3,500,311 | 3/1970 | Bishop | 340/52 |

*Primary Examiner*—Donald J. Yusko
*Assistant Examiner*—Glen R. Swann, III
*Attorneys*—Richard G. Geib and Plante, Arens, Hartz, Hix and Smith ABSTRACT: A power brake system having a pressure responsive device with three modes of response corresponding to three levels of pressure and an electronic control responsive to the output of the pressure responsive device to control a lamp to distinguishably indicate which of the three pressure levels is present.

PATENTED JUL 13 1971

INVENTORS
DONALD W. HOWARD,
BY KEITH H. FULMER &
HAROLD B. SCHULTZ

Plante, Arens, Hartz, Hix & Smith
ATTORNEYS

INVENTORS
DONALD W. HOWARD,
KEITH H. FULMER &
HAROLD B. SCHULTZ
BY
ATTORNEYS

PRESSURE INDICATING SYSTEM

BACKGROUND OF THE INVENTION

The invention concerns an improvement to pressure indicating systems generally used in association with power braking systems. However, it is felt that the invention may be used for any application where pressure indications are desired; and particularly, where the indicating means is remotely located with respect to a sensing means.

In all vehicles relying on power braking systems to stop the motion of the vehicle, it is important to maintain the correct pressure in the power braking system for a number of reasons. Specifically, a marginal pressure level in the power braking system could result in reduced braking efficiency upon application of the brakes by the vehicle operator. Moreover, a low pressure level in the power braking system could result in a loss of braking action upon application thereof by the vehicle operator and cause a complete loss of control of the vehicle. Therefore, it is important that the operator of the vehicle be advised at all times of the pressure level of his power braking system so that his driving techniques may be adjusted accordingly.

Summary of the Invention

It is the object of this invention to provide a pressure indicating system having a pressure responsive means inserted in the power braking system pressure line for identifying multiple pressure level modes.

It is another object of this invention to provide a pressure indicating system whose indicating element is responsive to the pressure levels of the power braking system.

It is another object of this invention to provide an electronic control means which is responsive to the multiple pressure level modes for control of the indicating elements to distinguishably indicate the multiple pressure level modes.

It is yet another object of this invention to provide an indicating element whose size and adaptability will facilitate its mounting in an area suitable for observation by the vehicle operator.

It is still another object of this invention to provide the capability to test the integrity of the pressure indicating system immediately prior to energizing the power braking system.

Other objects and features of the invention will be apparent from the following description of the pressure indicating system taken in connection with the accompanying drawings.

DESCRIPTION OF THE PREFERRED EMBODIMENT

Figure 1:
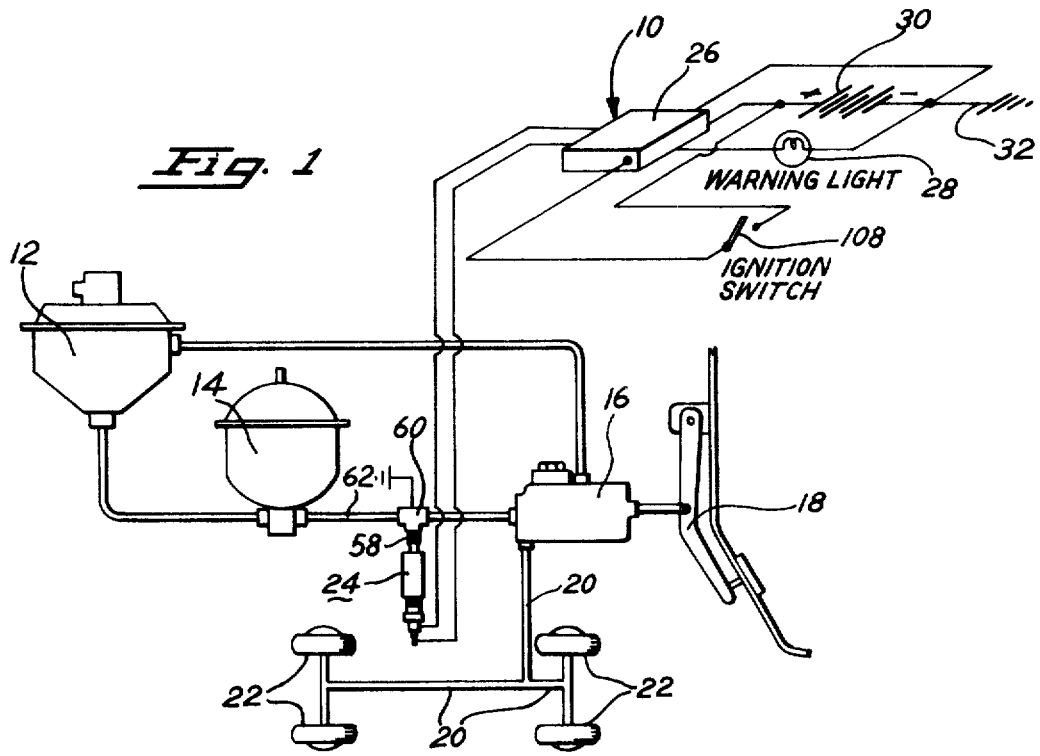
FIG. 1 is a schematic presentation of a full hydraulic power brake system in which my invention is utilized.

Referring now to the drawings and particularly FIG. 1, illustrating the preferred embodiment of the invention, a form of our pressure indicating system 10 is shown embodied in a full power brake system including a pump 12, an accumulator 14, a brake actuator valve 16 and a brake pedal 18. The system further includes conduits 20 for communicating the braking fluid under pressure to the wheels 22. Each wheel is of course equipped with a conventional wheel brake assembly.

The pressure indicating system 10 is comprised of a pressure responsive means 24, an electronic control means 26, an indicator means 28, a source of voltage 30, and an electrical ground 32.

Figure 2:
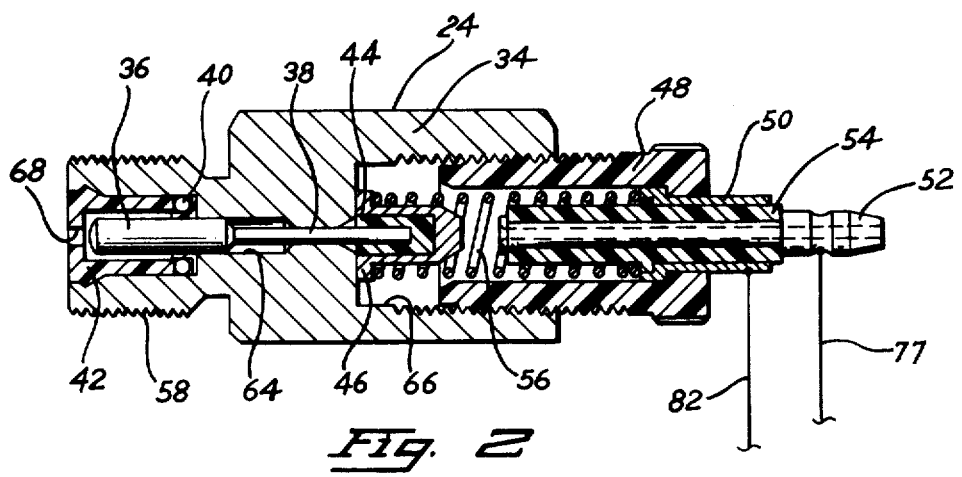
FIG. 2 is an enlarged sectional view of the pressure responsive means shown in FIG. 1.

Referring now to FIG. 2, said pressure responsive means 24 comprises a conductive housing 34, a plunger element 36, a shaft 38, a seal 40, a retainer 42, and insulator plug 44, a conductive cap 46, a nonconductive plug 48, an outer conductive contact or terminal 50, an inner conductive contact or terminal 52, a nonconductive member 54, and a conductive resilient means 56. The conductive housing 34 is suitably adapted with a threaded end 58 for threadable engagement with a grounded fitting 60 of a pressure line 62 of said power braking system (as shown in FIG. 1). The plunger element 36 is slidably received in a bore 64 in said housing 34 and has one end exposed to the power braking system's variable pressure in the pressure line 62 while its other end operatively abuts the shaft 38 which slidably projects through said housing into a second bore 66 in said housing 34. The seal means 40, depicted as an O-ring lip type seal combination, is disposed intermediate the plunger element 36 and the conductive housing 34 to exclude the variable pressure in pressure line 62 from the second bore 66 of the housing 34. The retainer 42 operatively engages the housing 34 so as to keep the seal 40 in place with respect to the plunger element 36 and said housing 34. The retainer 42 has retainer bore 68 to allow the pressure in pressure line 62 to communicate with the plunger element 36. The retainer 42 further captivates the plunger element 36 in the bore 64. The shaft 38 has installed on its end that projects into bore 66, the insulator plug 44; which, in turn, receives the conductive cap 46. The bore 66 further has a threaded portion to receive a similar threaded portion of the nonconductive plug 48. The nonconductive plug 48 is adapted to carry the conductive contacts or terminals 50 and 52. Said contacts are separated by a nonconductive member 54. A conductive resilient means or spring 56 is suitably disposed between the outer conductive contact 50 and the conductive cap 46 to preload the conductive cap 46 against the conductive housing 34 so as to provide electrical continuity between the outer conductive contact and the housing. The plunger element 36 in cooperation with the shaft 38 is slidably responsive to the power braking system pressure increases in pressure line 62 so as to move the conductive cap 46 axially away from the conductive housing 34 and into engagement with the inner conductive contact 52.

The power braking system, as shown in FIG. 1, may have three operable modes corresponding to a reasonably low, an intermediate, and a reasonably high pressure level in pressure line 62. For example, the reasonably low pressure operable mode could range from 0 to 400 p.s.i. The intermediate pressure level mode could range from 400 to 1,000 p.s.i., and the reasonably high pressure level mode could range from 1,000 p.s.i. and up. It is generally desirable to have the power braking system operate at 1,000 p.s.i. and above; however, marginal performance could be attained in the intermediate zone. To operate in the reasonably low mode would probably compromise the safety of the vehicle. It is noted here that the power braking system may use fewer or more than the three operable pressure modes described hereinabove. It is clearly intended that such systems will fall within the scope of this invention.

Thus, to provide for a meaningful pressure indicating system that reflects each of the operable modes it is necessary for the pressure responsive means 24 to be capable of reflecting each of these pressure level modes. Cooperation of the pressure responsive means 24, the electronic means 26, and the indicator means 28 to accomplish this will be explained more fully hereinafter. Specifically, referring to the pressure responsive means 24, the conductive resilient means 56 is of a predetermined preload so that the plunger element 36 in cooperation with shaft 38 will not slidably respond to said reasonably low pressure level of said power braking system so as to maintain electrical continuity between the outer contact 50 and the conductive housing 34. The plunger element 36 in cooperation with shaft 38 will slidably respond to said intermediate pressure level of said power braking system to move the conductive cap 46 away from the conductive housing 34 so as to disrupt electrical continuity between the outer contact 50 and the conductive housing 34. As the pressure in pressure line 62 reaches a reasonably high pressure level the plunger element 36 in cooperation with shaft 38 will slidably respond thereto and move the conductive cap 46 axially into contact with the inner conductive contact 52 establishing electrical continuity between the outer conductive contact 50 and the inner conductive contact 52 through the conductive resilient means 56.

Figure 3:
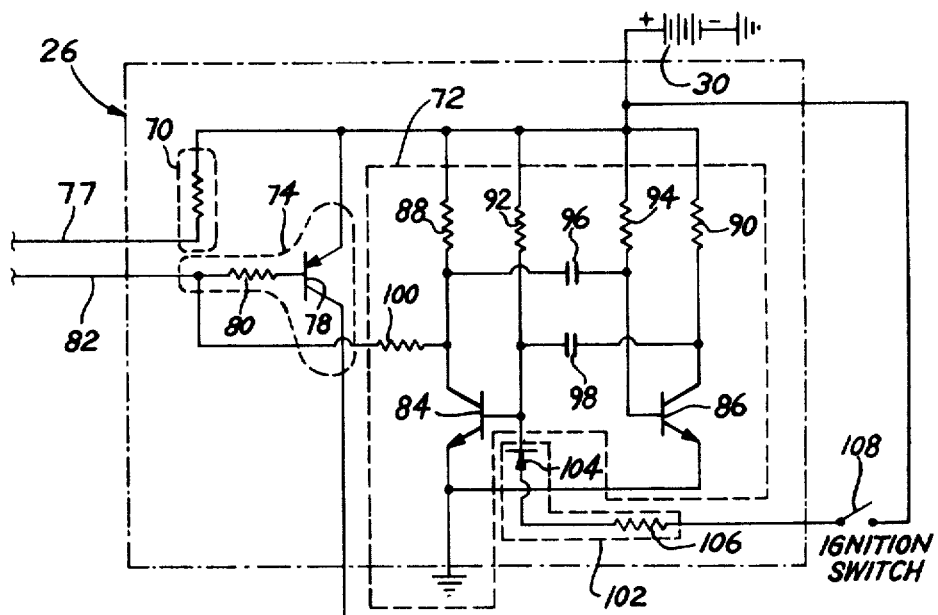
FIG. 3 is a schematic presentation of the electronic control means shown in FIG. 1.

With reference now to FIG. 3, which is a schematic presentation of the electronic control means 26 shown in FIG. 1, said electronic control means 26 comprises a voltage drop means or resistor 70, a switching generator or free-running multivibrator 72 and a control element 74. The electronic control means 26 is responsive to the pressure responsive means 24 for controlling an indicator means or incandescent lamp 76 to indicate the pressure level mode at which the power braking system is operating. The resistor 70 is connected on one end to the source of voltage 30 and connected on its other end, through wire 77, to the inner contact 52 of the pressure responsive means 24. The control element 74 is comprised of transistor 78 and input resistor 80. The transistor 78 is of the PNP variety having its emitter connected to the source of voltage 30 and its base lead connected to the input resistor 80. The other end of the input resistor is connected through wire 82 to the outer conductive contact 50 of the pressure responsive means 24. The collector lead of the transistor 78 is in series flow relationship with the incandescent lamp 76, which in turn is grounded. Thus, the transistor 78 is responsive to the signal it receives in the way of an input to control voltage across and current to the incandescent lamp 76. The conventional switching generator or free-running multivibrator 72 is comprised of transistors 84 and 86, load resistors 88 and 90, timing resistors 92 and 94, timing capacitors 96 and 98 and an output coupling resistor 100. As may be seen by those skilled in the art, the free-running multivibrator 72 is of conventional design. Thus, components for its design may be selected so as to provide an output at 1 cycle per second through the output coupling resistor 100 to the input wire 82 of the control element 74. It will be further understood by those skilled in the art, that the frequency at which the free running multivibrator operates may be varied by a suitable selection of the timing resistors and capacitors. It is further noted that the ratio of the on-time to off-time of the multivibrator may be selected in accordance with the application. As shown, the multivibrator 72 is operative to switch the control transistor 78 off and on as a function of the on or off condition of transistor 84. Thus, as transistor 84 of multivibrator 72 is turned on so will transistor 78 be turned on so as to conduct current therethrough causing the incandescent lamp 76 to glow or light. When the multivibrator 72 switches, thus, turning off transistor 84, likewise transistor 78 will be turned off and the incandescent lamp 76 will cease to glow.

As mentioned before, the pressure responsive means 24 provides a continuity path to ground for the control element 74 through the outer conductive contact 50, the resilient means or spring 56, the conductive path and the conductive housing 34. When the input to control element 74 is grounded through the wire 82, the control transistor 78 will continuously conduct current, thereby energizing the incandescent lamp 76 so as to make it glow.

In response to an intermediate pressure level of the power braking system the pressure responsive means 24 will provide an open circuit to the input of the control element 74. Thus, the free-running multivibrator 72 will assume control of the transistor 78 and intermittently switch it on and off causing the incandescent lamp 76 to be turned on and off which results in the bulb displaying a flashing effect.

In response to a reasonably high pressure level associated with the power braking system the pressure responsive means 24 will provide a voltage from the voltage drop means 70 through wire 77, inner conductor 52, conductive cap 46, conductive resilient means 56, outer conductor 50 and wire 82 to the input of the control element 74. This voltage will be of a sufficient positive magnitude to override the effect of the multivibrator 72 on the control element 74, to permanently bias the control element 74 off. With the transistor 78 in the nonconducting state the incandescent lamp 76 will, of course, be turned off.

Therefore, it can be seen that when the power braking system is operating at its normal high pressure level the indicator means or lamp 76 will not glow. When the pressure level of the braking system drops into the intermediate pressure level zone the lamp 76 will intermittently flash, thereby indicating to the operator of the vehicle that his braking efficiency will be marginal. If the pressure level in the braking system should drop still further and become very low the lamp 76 will continuously glow to advise the vehicle operator that his braking system is wholly unsafe.

A test means 102 is provided to the operator of the vehicle to check the integrity of the pressure indicating system prior to operation of the vehicle. The test means 102 is comprised of a diode 104 and a resistor 106 in series flow relationship between the base of transistor 84 and the source of voltage 30. The test means 102 becomes operative when an ignition switch 108 is closed during the period necessary for the starter mechanism of the vehicle to start the vehicle engine. During the period when the ignition or starter switch 108 is closed the source of voltage 30 is communicated through resistor 106 and diode 104 to turn transistor 84 of the multivibrator 72 on. This, in turn, causes transistor 78 to be turned on thereby energizing the incandescent lamp 76 to make it glow. It is parenthetically noted that during the period of time that the test means 102 is energized the voltage applied to the base of transistor 84 simply overrides the normal functioning of the multivibrator. Upon deactivation of test means 102 the multivibrator 72 returns to its normal free-running function.

It is further noted that the indicator means 28 may be a separate module or element from the remainder of the system and suitably installed on the dashboard or elsewhere in the vehicle to facilitate visual acquisition thereof by the vehicle operator. It may be desirable to have the indicator means 28 positioned so that the vehicle operator will not have to move or turn his head to see it during normal driving. Moreover, the electronic control means 26 may be installed remote from the indicator means and the pressure responsive means 24. For the preferred embodiment it can be seen that only two wires interconnect the pressure responsive means 24 and the electronic control means 26 while only one wire is needed to connect the electronic control means 26 with the indicator means 28. Thus, the pressure indicating system 10 is conveniently comprised of modules whose placement may be optimized with respect to the other components of the vehicle.

MODE OF OPERATION OF THE PREFERRED EMBODIMENT

When the operator of the vehicle turns the ignition or starter switch 108 to start the engine of the vehicle the source of vehicle voltage 30 will be imposed upon the multivibrator 72 so as to energize the control element 74 causing the incandescent lamp 76 to light, thereby indicating that the electronic control means 26 and the indicator means are substantially operative. At the time the vehicle engine is starting the pump 12 begins to build up fluid pressure in the power braking system lines. During this interval the pressure in the power braking system lines will be reasonably low and thus, the pressure responsive means 24 will be providing an electrical ground, as aforementioned, to the input of the control element 74 of the electronic control means 26. This grounded input will cause the transistor 78 to conduct thereby energizing the incandescent lamp 76 causing it to glow continuously. As the pump 12 continues to build up pressure in the power braking system lines an intermediate pressure level will be reached, at which time, the pressure responsive means 24 will provide an open circuit to the input of the control element 74. During this interval the control element 74 will be responsive to the free-running multivibrator 72 which will switch the transistor 78 on and off causing the incandescent lamp 76 to flash. When the pump 12 in cooperation with the accumulator 14 brings the fluid pressure and the power braking lines to its normally reasonably high operative level the pressure responsive means 24 will provide a predetermined bias voltage to the control element 74 which will turn transistor 78 off. At this time the incandescent lamp 76 will be deenergized and cease to glow, thus indicating to the operator of the vehicle that the pressure levels associated with the power braking system have reached their normal operative levels.

In addition to the test means 102 described above the operator of the vehicle is given a reasonable assurance that the entire pressure indicating system is in operable order since in the short time span between the time the engine is started and the time that the pump brings the pressure level of the power braking system to its normal operative mode, the operator of the vehicle has seen the indicator means 76 first flow continuously, then flash, and eventually turn off. When the pressure levels associated with the power braking system have reached their normal operative mode they should remain there under normal driving conditions, thus at the instant that the indicator means 76 begins to slash or glow continuously the operator of the vehicle is advised that a potential problem associated with the power braking system could be developing.

It is parenthetically mentioned that since the pressure indicating system 10 is used as somewhat of a warning device to the operator of the vehicle, the indicator means 76 may employ a red incandescent lamp.

DESCRIPTION OF THE MODIFIED EMBODIMENT

In the embodiment shown in FIG. 4, those parts which are identical to corresponding parts of the preferred embodiment depicted in FIG. 1, will be given the same identifying numbers.

Figure 4:
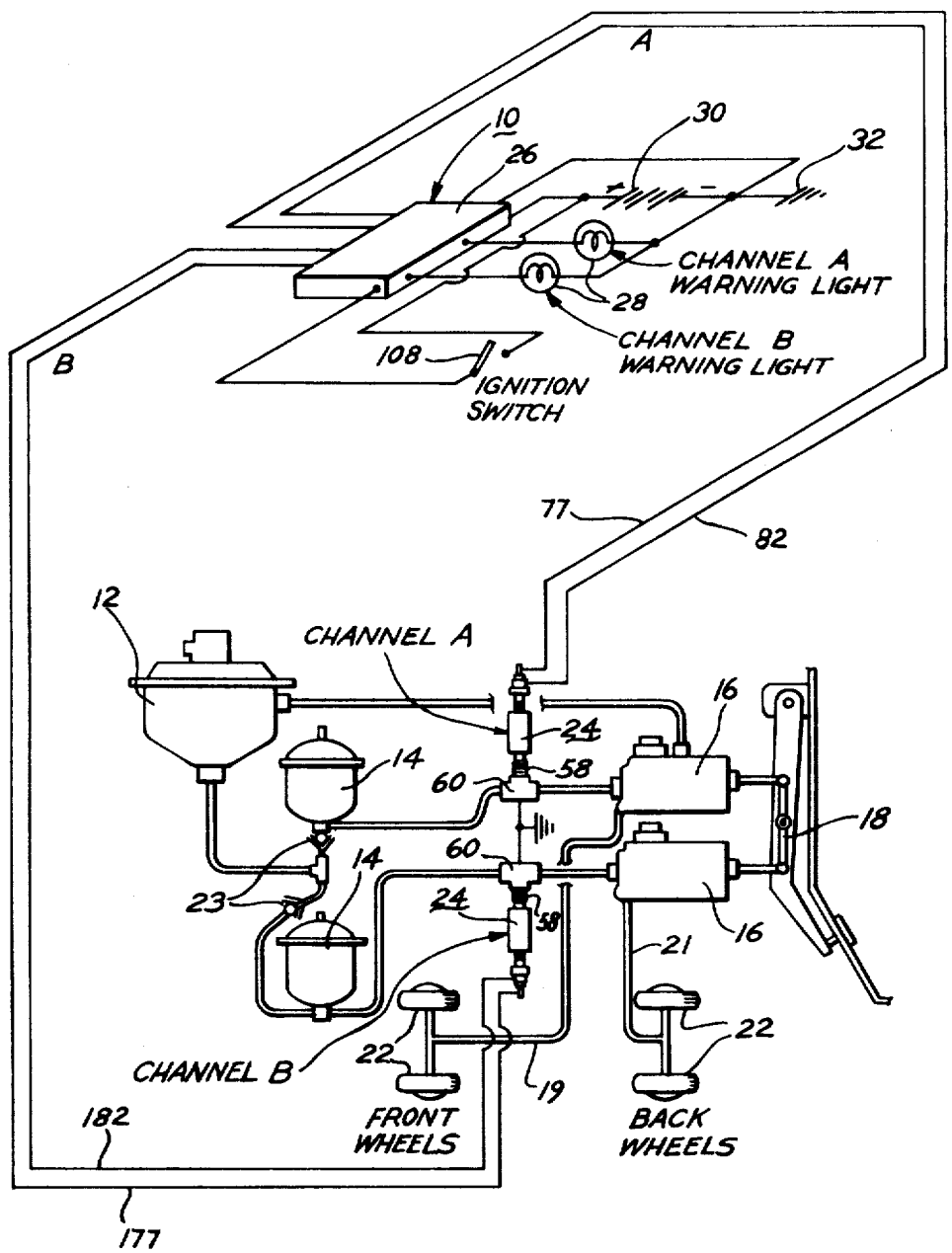
FIG. 4 is a schematic presentation of a modified form of an invention embodied in a dual full power brake system.

With reference now to FIG. 4, a modified form of the pressure indicating system 10 is shown embodied in a dual full-power braking system of the hydraulic type including a pump 12, two accumulators 14 and two brake actuating valves 16. Further, the system includes a brake pedal 18 whose actuation causes the actuating valves 16 to communicate hydraulic fluid through conduits 19 and 21 to the wheels 22. Thus, the dual full power braking system has a channel A and a channel B for actuating, respectively, the front and rear wheels of a vehicle. To insure complete independence of each of channels A and B, check valves 23 are interposed between each of the accumulators 14 and the single pump 12, used for both.

The modified pressure indicating system 10 is comprised of two pressure responsive means 24, and electronic control means 26, and indicator means 28, the source of voltage 30 and an electrical ground 32.

A pressure responsive means 24 as depicted in FIG. 2, is inserted in each of the hydraulic pressure lines associated with channels A and B and suitably installed in a grounded fitting 60 as hereinabove explained. The pressure responsive means 24 are intended to structurally and functionally cooperate with the modified electronic control means 26 is providing pressure information for channels A and B in an identical manner as that described in the preferred embodiment.

Figure 5:
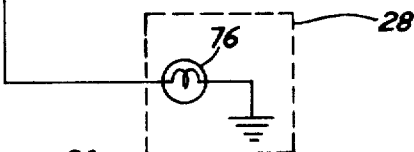
FIG. 5 is a schematic presentation of the electronic control means shown in FIG. 4.
Figure 5:
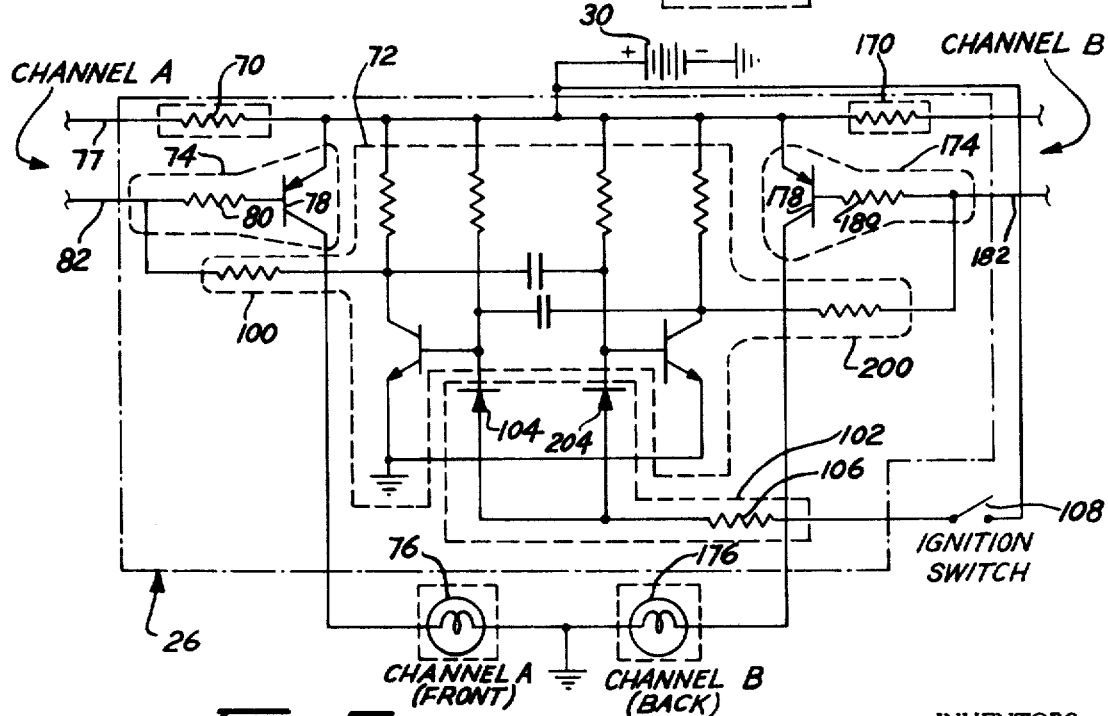

With reference now to FIG. 5, the modified electronic control means 26 comprises a voltage drop means or resistor 70, a voltage drop means or resistor 170, a switching generator or free-running multivibrator 72, a control element 74, and a control element 174. The voltage drop means 70 and the control element 74 of the electronic control means 26 are responsive to pressure responsive means 24 installed in channel A of the dual full power braking system. Voltage drop means 170 and control element 174 of the control means of the electronic control means 26 are responsive to the pressure responsive means 24 installed in channel B of the dual full-power braking system. An indicator means or incandescent lamp 76 is responsive to pressure variations associated with channel A while an indicator means or incandescent lamp 176 is responsive to pressure fluctuations associated with channel B. The resistor 170 is connected on one end to the source of voltage 30 and connected on its other end through wire 177 to the inner contact 52 of the pressure responsive means 34 associated with channel B. The control element 174 is comprised of transistor 178 and input resistor 180. The transistor 174 is of the PNP variety having its emitter connected to the source of voltage 30 and its base lead connected to the input resistor 180. The other end of the input resistor is connected through wire 182 to the outer conductive contact 50 of the pressure responsive means 24. The collector lead of the transistor 178 is in series flow relationship with the incandescent lamp 176, which in turn is grounded. Thus, the transistor 178 is responsive to the signal it receives in the way of an input, to control voltage across and current to the incandescent lamp 176. The conventional free-running multivibrator 72 is operatively connected to the control element 174 at input 82 by means of an output coupling resistor 200 having its other end attached to the collector lead of transistor 86 of said multivibrator 72. It is noted that the multivibrator 72 is of such a design that while transistor 84 is on, transistor 86 is off, and vice versa. Thus, since control element 174 is functionally responsive to channel B in the same manner that control element 74 is functionally responsive to channel A, the incandescent lamps 76 and 176 will flash alternately when said control elements are responsive to the free-running multivibrator 72. Should it be desirable to have the incandescent lamps 76 and 176 flash on and off together the control elements 74 and 174 would need to be operatively connected to the same transistor of the free-running multivibrator 72.

As will be readily understood by those skilled in the art, the electronic control means 26 is responsive simultaneously to the pressure level indications from channel A and channel B of the dual full power braking system in a manner identical to that explained in the preferred embodiment. Regarding the test feature associated with the pressure indicating system 10, a diode 204 is added to the test means 102 described in the preferred embodiment intermediate the resistor 106 and the base lead of transistor 86 of multivibrator 72. The functional relationship of diode 204 with respect to transistors 86 and 178 is identical to that described in the preferred embodiment; namely, during the period when the ignition or starter switch 108 is closed the source of voltage is communicated through resistor 106 and diode 204 to turn transistor 86 of the multivibrator 72 on. This, in turn, causes transistor 178 to be turned on thereby energizing the incandescent lamp 176 to make it glow. Therefore, the test means 102 provides the operator of the vehicle a check on the integrity of both channels of the pressure indicating system prior to operation of the vehicle.

The operation and performance of the modified form of the pressure indicating system 10 shown in FIG. 4 is practically identical to the preferred embodiment of FIG. 1 and needs no further description of its operation.

While the specific details have been herein shown and described, the invention is not confined thereto, as other substitutions can be made within the spirit and scope of the invention.

We claim:

1. In a power braking system a pressure responsive means comprising:

a conductive housing which is adapted to be threaded to a grounded fitting of a pressure line of said power braking system;

a plunger element slidably received in a first bore in said housing and having one end exposed to said variable pressure in said pressure line while the other end projects through said housing into a second bore in said housing;

said other end having installed thereon an insulator plug for receiving a conductive cap;

said second bore being adapted to receive a nonconductive plug which carries an outer conductive contact and an inner conductive contact separated by a nonconductive member;

a conductive resilient means being disposed between said outer conductive contact and said conductive cap to preload said conductive cap against said housing so as to provide electrical continuity between said outer conductive contact and said housing;

said plunger element being slidably responsive to said power braking system pressure increases so as to move said conductive cap axially away from said housing and into engagement with said inner conductive contact.

2. In a power braking system a pressure responsive means comprising:

a conductive housing which is adapted to be threaded to a grounded fitting of a pressure line of said power braking system;

a plunger element slidably received in a first bore in said housing and having one end exposed to said variable pressure in said pressure line while the other end projects through said housing into a second bore in said housing;

a seal means intermediate said plunger element and said housing to exclude said variable pressure from said second bore;

said other end having installed thereon an insulator plug for receiving a conductive cap;

said second bore threaded to receive a threaded nonconductive plug being adapted to carry an outer conductive contact and an inner conductive contact separated by a nonconductive member;

a conductive resilient means being disposed between said outer conductive contact and said conductive cap to preload said conductive cap against said housing so as to provide electrical continuity between said outer conductive contact and said housing;

said plunger element being slidably responsive to said power braking system pressure increases so as to move said conductive cap axially away from said housing and into engagement with said inner conductive contact;

said conductive resilient means being of predetermined preload so that said plunger element will not slidably respond to a reasonably low pressure level of said power braking system so as to maintain electrical continuity between said outer contact and said housing;

said plunger element slidably responding to an intermediate pressure level of said power braking system to move said conductive cap away from said housing so as to disrupt electrical continuity between said outer contact and said housing;

said plunger element slidably responding to a reasonably high pressure level of said power braking system to move said conductive cap into contact with said inner conductive contact establishing electrical continuity between said outer and inner contacts.

3. In a power braking system, a pressure indicating system comprising:

a conductive housing secured to a grounded fitting of a pressure line of said power braking system;

a plunger member slidably received in a first bore in said housing, said plunger member having one end exposed to the fluid pressure in said pressure line while the other end projects through said housing into a second bore in said housing;

an insulator plug secured to said other end of said plunger having a conductive cap received thereon;

a nonconductive plug closing said second bore having an outer conductive contact and an inner conductive contact separated by a nonconductive member;

a conductive resilient member located between said conductive cap and said outer conductive contact for biasing said conductive cap against said housing to provide electrical conductivity between said outer conductive contact and said housing;

said plunger member being slidably responsive to the fluid pressure in said pressure line to move said conductive cap axially away from said housing and into engagement with said inner conductive contact;

electronic control means connected to said inner conductive contact and said outer conductive contact for receiving a signal corresponding to the position of said conductive cap; and indicator means connected to said electronic control means for indicating variable pressure levels in said power braking system.

4. In a power braking system, a pressure indicating system comprising:

pressure responsive means connected to the power braking system, said pressure responsive means being responsive to variable fluid pressure levels in said power braking system, said pressure responsive means having operable modes corresponding to low, intermediate and high fluid pressure in said power braking system, said pressure responsive means having first and second terminals to identify the mode of operation present in the power braking system;

electronic control means connected to a source of voltage, an electrical ground and said first and second terminal of pressure responsive means, said electronic control means including, a generator producing an output which alternately switches from an ON period to an OFF period;

voltage drop means connected to said source of voltage and said first terminal;

a control element for regulating voltage across and current from said electronic control means, said control element having an input connected to said second terminal and said generator, said second terminal receiving a signal corresponding to ground, an open circuit, and a voltage less than said source of voltage in a direct relationship to said low, intermediate and high fluid pressure mode of operation; and indicator means connected to the output from said control element to communicate to an operator the fluid pressure level in said power braking system, said indicator means being continuously activated during low fluid pressure, intermittently activated during intermediate fluid pressure and deactivated during high fluid pressure in said power braking system.

5. In a power braking system, means for determining the operational fluid pressure available in the system, said means comprising:

pressure responsive means connected to the power braking system for registering variable pressure levels in the power braking system, said pressure responsive means having a mode of operation corresponding to low, intermediate and high fluid pressure in the system, said pressure responsive means having different electrical circuits for carrying a signal resulting from the mode of operation;

electronic control means for receiving said signal resulting from the mode of operation, said electronic control means allowing current flow in response to said signal, said current flow being distinguishable for each mode of operation; and indicator means for receiving said distinguishable current flow to communicate to an operator the mode of fluid pressure operation associated therewith.

6. The power braking system, as recited in claim 5, wherein said indicator means includes:

a lamp energized by said distinguishable current flow for visually indicating to an operator the mode of operation, said electronic control means allowing current to flow during periods of low fluid pressure mode of operation causing said lamp to continually glow, to intermittently flow during periods of intermediate fluid pressure causing said lamp to blink and to interrupt flow during periods of high fluid pressure causing said lamp to remain deenergized.

7. In the power braking system, as recited in claim 6, wherein said electronic control means includes:
- a source of electrical energy;
- switching means for regulating said distinguishable current flow to said lamp, said switching means being connected to a first circuit of said different circuits for carrying a signal of the mode of operation of said pressure responsive means and said source of electrical energy;
- voltage drop means connected to said source of electrical energy and said switching means for carrying a signal of the mode of operation through a second circuit of said different circuits; and
- means connected to said source of electrical energy and said switching means for generating ON-OFF current flow in response to the intermediate mode of operation in said pressure responsive means.

8. In the power braking system, as recited in claim 7, wherein during periods of low fluid pressure said first circuit carries a signal for this mode of operation causing said switching means to continually supply current flow for energizing said lamp.

9. In the power braking system, as recited in claim 8, wherein during periods of high fluid pressure a signal for this mode of operation is carried by said second circuit through said voltage drop means and by said first circuit to said switching means causing current flow from said switching means to be interrupted.

10. The power braking system, as recited in claim 9, further including:
- test means connected to said source of electrical energy for checking the operativeness of the electronic control means and indicator means in response to closing the ignition switch by an operator.

11. The power braking system, as recited in claim 10, wherein said pressure responsive means includes:
- a housing having a first bore and a second bore, said first bore being connected to receive fluid pressure from said braking system;
- fluid responsive means located in said first bore adapted to move in response to variations in fluid pressure;
- receptive means located in said second bore for registering changes in position of said wall means; and
- transmitting means connected to said receptive means for conveying a signal through one of said electrical circuits corresponding to the mode of operation as determined by the position of said fluid responsive means.

12. The power braking system, as recited in claim 11, wherein said fluid responsive means includes:
- a plunger located in said first bore with a shaft which extends into said second bore, said shaft being slidable in an opening of said housing, said plunger having a larger diameter than the opening in said housing through which said shaft extends, said larger diameter coming into contact with said housing to limit the movement of said plunger in said first bore during a fluid pressure mode of operation.

13. The power braking system, as recited in claim 12, wherein said receptive means includes:
- cap means having an electrical nonconductive interior secured to said shaft and an electrical conductive exterior, said electrical conductive exterior providing a contact between the movable plunger and the electrical circuits corresponding to the mode of operation representing the fluid pressure in said braking system.

14. The power braking system, as recited in claim 13, wherein said transmitting means includes:
- a plug means for closing said second bore to form a chamber therein, said plug member having an outer nonconductive member surrounding a plurality of different electrical circuits, each of said plurality of electrical circuits being connected to said electronic control means for transmitting a mode of operation signal.

15. The power braking system, as recited in claim 14, wherein said transmitting means further includes:
- resilient means located between said plug means and said cap means for urging said plunger member away from the opening in said housing through which the shaft extends to thereby require a predetermined fluid pressure to move said plunger into a mode of operation.

16. The power braking system, as recited in claim 15, wherein said resilient means provides an electrical path between said first circuit and said second circuit during the high pressure mode of operation permitting a signal to be carried to said switching means for interrupting current flow to said lamp.

17. The power braking system, as recited in claim 16, further including:
- a seal surrounding said plunger and contacting said first bore for preventing said variable pressure access to said second bore through the opening for the shaft in said housing.

18. The power barking system, as recited in claim 17, further including:
- retaining means located in said first bore for captivating said plunger in said first bore while permitting fluid pressure to be communicated fully to said first bore.

19. The power braking system, as recited in claim 18, wherein said plug means is adjustable within said second bore to assure an electrical connection between said conductive exterior of the cap means and said second circuit leading to the electronic control means.